United States Patent [19]

Watanabe

[11] Patent Number: 4,490,842
[45] Date of Patent: Dec. 25, 1984

[54] HEADREST SPEAKER DEVICE

[75] Inventor: Tatsuya Watanabe, Tokyo, Japan

[73] Assignee: Clarion Co., Ltd., Tokyo, Japan

[21] Appl. No.: 379,546

[22] Filed: May 18, 1982

[30] Foreign Application Priority Data

May 22, 1981 [JP] Japan ............................ 56-73264[U]

[51] Int. Cl.³ .......................... H04R 1/02; H04R 5/02
[52] U.S. Cl. ........................................ 381/86; 381/24;
179/146 H; 181/156
[58] Field of Search ............... 381/24, 86; 179/146 H,
179/157; 181/156, 155

[56] References Cited

U.S. PATENT DOCUMENTS

| 3,303,279 | 2/1967 | Tinklepaugh | 179/146 H |
| 4,042,791 | 8/1977 | Wiseman | 179/146 H |
| 4,210,778 | 7/1980 | Sakurai | 181/156 |
| 4,210,784 | 7/1980 | Phillips | 179/146 H |
| 4,310,307 | 1/1982 | Bellisario | 179/146 H |

FOREIGN PATENT DOCUMENTS

| 484704 | 5/1938 | United Kingdom | 181/156 |
| 827306 | 2/1960 | United Kingdom | 179/146 H |

OTHER PUBLICATIONS

"Loudspeaker Design", *Wireless World*, E. J. Jordan, Feb. 1956, p. 75.

*Primary Examiner*—Stafford D. Schreyer
*Assistant Examiner*—L. C. Schroeder
*Attorney, Agent, or Firm*—Flynn, Thiel, Boutell & Tanis

[57] ABSTRACT

Headrest speaker device, in which the upper ends of pipes supporting a headrest on the upper part of a seat are in communication with speaker cabinets disposed at each side of the headrest and the lower ends of the pipes open toward the outside at the sides of the seat.

11 Claims, 10 Drawing Figures

FIG. 9(A) FIG. 9(B)
PRIOR ART PRIOR ART

HEADREST SPEAKER DEVICE

BACKGROUND OF THE INVENTION

1. Field of the Invention

This invention relates principally to a speaker device mounted in a vehicle, specifically on the headrest of a seat.

2. Description of the Prior Art

For the stereo replay it is ideal that the distance between the two speakers $S_1$ and $S_2$ (FIG. 8) and the distances between each of the speakers and the listeners position L are all equal and that the listeners position is on the frontal axis of the speakers, i.e. that they are located at the three vertices of an equilateral triangle.

However, in car audio devices proposed heretofore, speakers have been mounted often either on the rear deck or on the rear doors, as shown in FIG. 9(A), or two on the front doors and two on the rear deck, as shown in FIG. 9(B). By this reason, when one listens music at a high power in a vehicle, the small space of the vehicle is filled with sounds, and when one listens to music at a low power, sounds are lost in engine noise or noises from the outside. In the case where the two speakers $S_1$ and $S_2$ are mounted at the rear part as shown in FIG. 9(A) then, due to the difference in sound intensity between the front and rear seats, sound intensity which is comfortable to those in the front seat can be so high for the rear seat that it is annoying for the listeners (passengers in the rear seat). In the four speaker system shown in FIG. 9(B), where 2 speakers $S_3$, $S_4$ are mounted also at the front, although the above-mentioned disadvantages of the two speaker system are eliminated, it has a disadvantage that the location of every passenger is deviated from the ideal listeners position for the stereo replay, which ideal position is the hatched region almost at the center of the interior of the vehicle. From the point of view of the intensity balance, it is not possible that all the passengers have an ideal sound intensity. Furthermore, there is another disadvantage in that sound pressure is lowered in the middle and high sound regions, because the direction of the seats does not coincide with the directivity of the speakers.

In order to realize an ideal audio space in the interior of a vehicle, which has many restrictions, the applicant of this invention has already proposed a headrest speaker device, in which speaker mounting brackets are fitted to the headrest supporting arm disposed on the seat and speaker cabinets are mounted pivotally at both the sides of the headrest by means of these brackets (published Japanese Application No. 57-133188).

SUMMARY OF THE INVENTION

This invention is an improvement of the apparatus disclosed in this prior application, in which specifically paying attention to the headrest supporting arm, the arm is made of a hollow pipe, the upper end of which is so mounted that it is in communication with the interior of a speaker cabinet and the lower end of which opens toward the outside at the side of the seat so that unnecessary back pressure in the speaker cabinet is leaked through said hollow pipe, thus resonance and vibration of the cabinet are prevented and at the same time distortion in the middle and low frequency regions is reduced. Further, said hollow pipe is used as a bass reflex duct and replay frequency characteristics at the low frequency region are ameliorated.

BRIEF DESCRIPTION OF THE DRAWINGS

FIGS. 9(A) and (B) are plans for explaining the relation between the location of speakers mounted in a vehicle and an ideal sound field in the prior art technique.

DETAILED DESCRIPTION OF THE PREFERRED EMBODIMENTS

Figure 1:
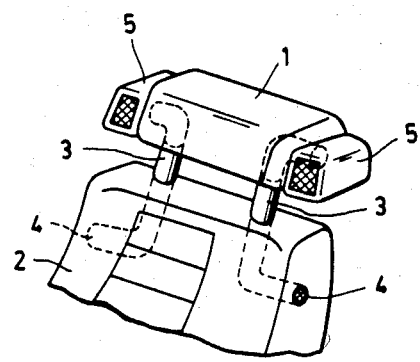
FIG. 1 is a perspective view showing an example of the device according to this invention.
Figure 2:
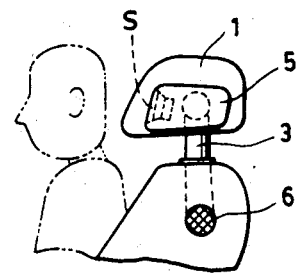
FIG. 2 is a side view of the device of FIG. 1.
Figure 3:
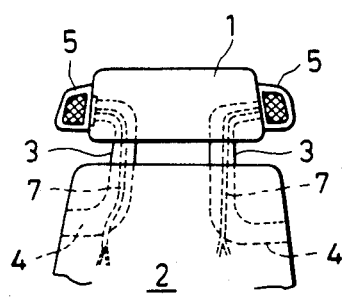
FIG. 3 is a front view of the device of FIG. 1.
Figure 4:
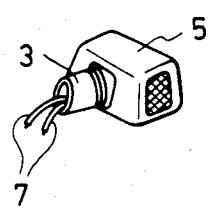
FIG. 4 is a perspective of a speaker cabinet of the device of FIG. 1.
Figure 5:
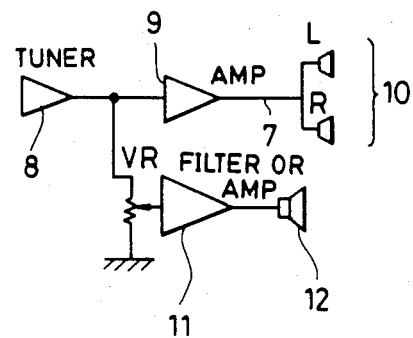
FIG. 5 is a schematic diagram of a speaker system showing an example of the device according to this invention.

Hereinbelow this invention will be explained more concretely, referring to the drawings:

In FIGS. 1 to 3, (1) is a headrest supported above a backrest (2) of a seat, and (3), (3) are pipes supporting the headrest (1). As evident from FIG. 3, each pipe 3 is generally U-shaped and has a vertical bight and two generally horizontal legs. These pipes are made of a soft elastic material such as a synthetic resin and their main part is buried into the backrest (2). These supporting pipes are so mounted that their upper end is in communication with the interior of a speaker cabinet (5) located at each side of the headrest and supports the speaker cabinet, as shown in FIG. 3. On the other hand these pipes (3) are bent and disposed in the backrest (2) of the seat, and their lower ends open toward the outside through openings provided at each side of the seat. Thus, the pipes are so constructed that sound waves radiated from the back of the speaker S disposed in the cabinet are exhausted through the pipes (3) toward the outside at the side of the seat. The reference numeral (6) represents a Saran net disposed at the opening of the lower end (4) of a pipe (3). The reference numeral (7) represents electrical wires for the speaker which pass through the pipe (3), as shown in FIGS. 3 and 4. FIG. 5 is a block diagram showing a preferred embodiment of a composed speaker system according to this invention. In this figure, the reference numeral (8) is a deck or a tuner; the reference numeral (9) is a power amplifier; and the reference numeral (19) represents a headrest speaker device according to this invention. Further the reference numerals (11) and (12) represent a filter or a power amplifier and an audio frequency speaker, respectively.

Since the device according to this invention is constructed as mentioned above, it has the following effects. At first, since the device according to this invention sets unnecessary sound waves radiated from the back of the speaker disposed in the speaker cabinet free toward outside through the pipe ducts, resonance and vibration of the cabinet are prevented and, further, distortions in the low and middle frequency regions are suppressed. Accordingly another advantage can be obtained in that a wide-spread choice in material for the enclosure and in the thickness of plates is enabled.

Figure 6:
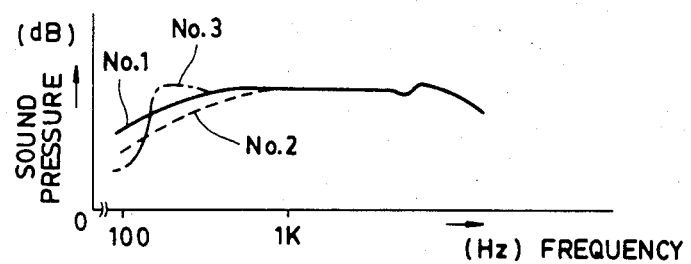
FIG. 6 is a graph representing replay frequency characteristics of a device according to this invention and characteristics of a prior art device.
Figure 7:
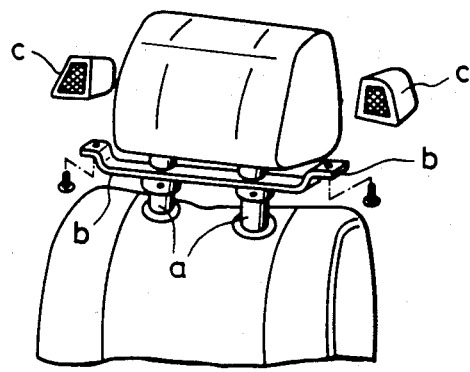
FIG. 7 is a perspective view of an exploded prior art headrest speaker device.
Figure 8:
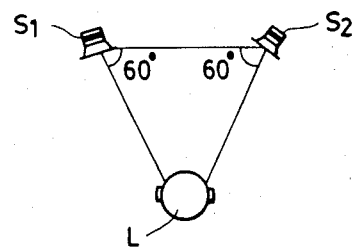
FIG. 8 is a plan for explaining the relation between the ideal listeners position and speaker arrangement for stereo replay.
Figure 8:
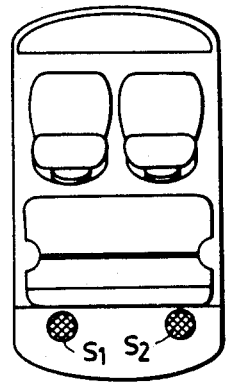
Figure 8:
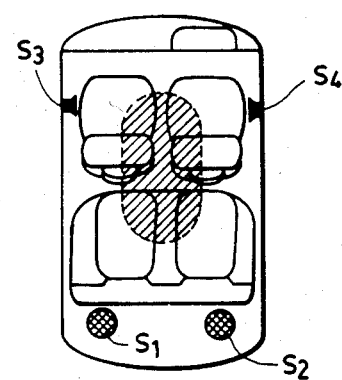

Furthermore, since the conventional headrest speaker has a small volume, its low frequency characteristics are not good. However, in the device according to this invention, since the pipe which holds a headrest speaker is so mounted that its upper end is in communication with the interior of the speaker cabinet and its lower end opens at the side of the seat, the pipe acts as bass reflex duct, sound waves radiated from the lower end of the pipe ameliorate low frequency characteristics, interacting with sound waves radiated from the front. FIG. 6 is a diagram representing differences in replay frequency characteristics between the device having a bass reflex duct (pipe) according to this invention, as mentioned above, and a prior art device having no bass reflex duct. In the figure, the one-dot-one-dash line No. 3 shows a characteristic curve for a device according to this invention; the continuous line No. 1 shows a characteristic curve for a closed prior art device without a duct; and the broken line No. 2 shows a characteristic curve for an open back type prior art device without a duct. As shown in the figure, in the case where the device has a duct, the sound pressure level of the speaker remains flat up to the resonance frequency and the duct lowers the least resonance frequency 50.

In general, the larger the opening of the bass reflex duct, the stronger is the leak in the middle and high frequency regions. However, since in the device according to this invention the headrest supporting pipe acting as bass reflex duct is not only long but also bent, it can be so constructed that it acts effectively only in the low frequency region.

As discussed above, according to this invention, since the headrest supporting pipe not only holds the headrest but also sets unnecessary back pressure in the cabinet free, and acts as bass reflex duct, advantages can be obtained in that replay frequency characteristics in the low frequency region are ameliorated and that at the same time it can be used as cable duct for speaker wires.

The embodiments of the invention in which an exclusive property or privilege is claimed are defined as follows:

1. In an apparatus which includes a seat having a backrest and two spaced speaker cabinets supported on said backrest at the upper end thereof, the improvement comprising two elongate pipes which are external to said speaker cabinets and which each open at one end to the interior of a respective one of said speaker cabinets, said pipes improving the middle and low frequency response of said speaker cabinets and minimizing vibration thereof.

2. The apparatus according to claim 1, wherein each said pipe is operatively coupled to said backrest of said seat, said speaker cabinets being supported on said backrest by said pipes.

3. The apparatus according to claim 2, including a headrest which is supported above said backrest of said seat by said pipes and is disposed between said speaker cabinets.

4. The apparatus according to claim 2, wherein said pipes each extend into said backrest of said seat, wherein said seat has means defining an opening in each side thereof, and wherein an end of each said pipe which is remote from the associated speaker cabinet communicates with a respective one of said openings in said backrest.

5. The apparatus according to claim 4, including a headrest which is supported above said backrest by said pipes and is disposed between said speaker cabinets.

6. The apparatus according to claim 5, wherein each said pipe is approximately U-shaped and has two legs and a bight, one said leg extending generally horizontally from the associated speaker cabinet into said headrest, said bight extending generally downwardly out of said headrest and into said backrest, and the other said leg extending generally horizontally within said backrest to the associated opening in the side of said backrest.

7. The apparatus according to claim 4, including speaker wires which extend through each said pipe from the associated speaker cabinet to said backrest.

8. The apparatus according to claim 2, wherein each said pipe is made of a material which has a degree of resilient flexibility.

9. The apparatus according to claim 1, wherein said seat is adapted for use in a vehicle.

10. A headrest speaker device for a seat having headrest and backrest portions, comprising:
two upstanding elongated pipes including means adjacent the upper and lower ends thereof for respectively engaging the headrest and backrest and therewith supporting the headrest on the backrest;
two speaker cabinets spaced for producing sound at opposite sides of the headrest, the upper ends of said pipes being connected to and opening into respective ones of said speaker cabinets such that the interiors of each pipe and its respective speaker cabinet communicate acoustically, the lower ends of said pipes providing an acoustical outlet from said speaker cabinets in the region of said backrest, said pipes improving the low frequency sound output of said speaker cabinets while supporting said headrest on said backrest.

11. A headrest speaker device according to claim 10 in which wires for electrically energizing speakers in said speaker cabinets pass through said pipes.

* * * * *